F. H. WICKS & C. GOODMAN.
LATHE.
APPLICATION FILED OCT. 29, 1912.
1,061,891.
Patented May 13, 1913.
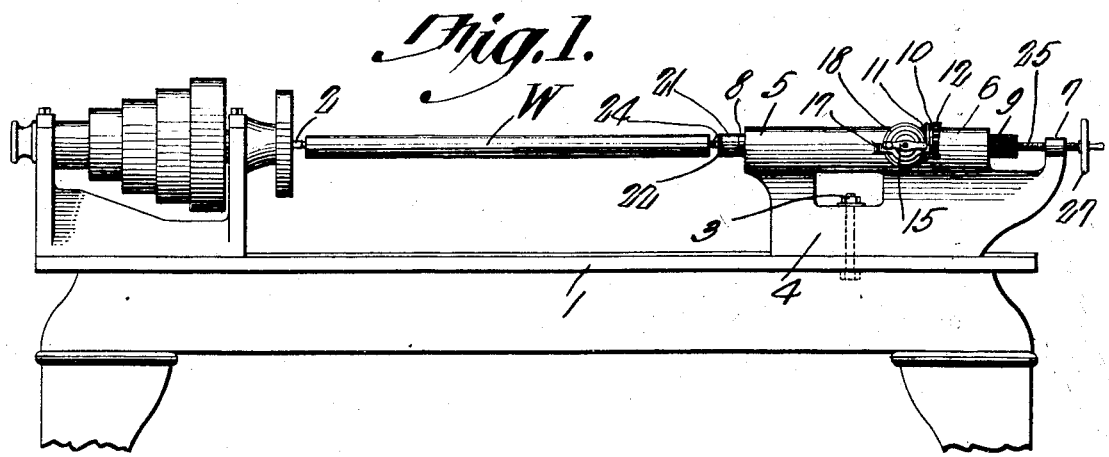
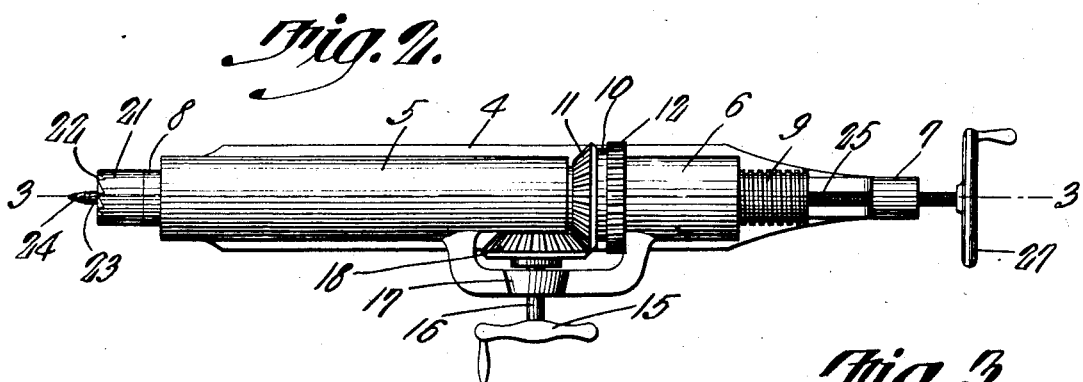
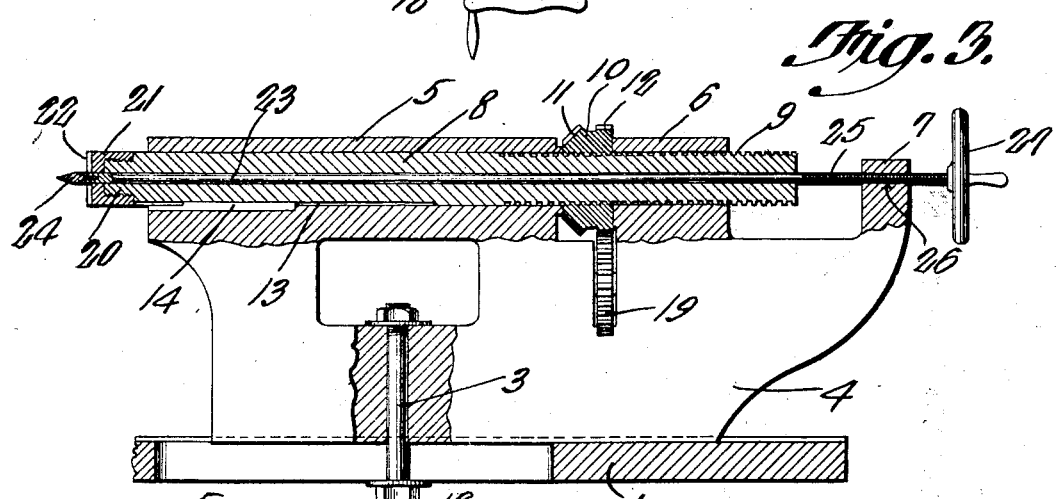
Frederick H. Wicks and
Charles Goodman, Inventors
Witnesses
by C. A. Snow & Co.,
Attorneys

UNITED STATES PATENT OFFICE.

FREDERICK H. WICKS AND CHARLES GOODMAN, OF ROANOKE, VIRGINIA.

LATHE.

1,061,891.

Specification of Letters Patent. Patented May 13, 1913.

Application filed October 29, 1912. Serial No. 728,467.

*To all whom it may concern:*

Be it known that we, FREDERICK H. WICKS and CHARLES GOODMAN, citizens of the United States, residing at Roanoke, in the county of Roanoke, State of Virginia, have invented a new and useful Lathe, of which the following is a specification.

The present invention relates to improvements in lathes, the primary object of the invention being the provision of a novel form of tail stock, in which the work engaging adjustable center and cutting tool will bore perfectly and will be rigid at all times during the operation of the cutter or boring tool, the same being especially adapted for use in turning down any standard round work performed in a lathe, the same being so constructed as to retain the centers true at all times and so that the work can be turned end for end after removal from the present tail stock upon a lathe of general construction or a similar constructed lathe.

A further object of the present invention is the provision of a tail stock for lathes, carrying a movable center, and either a forming or boring tool which may be used in conjunction with the center, the tail stock being so constructed that the same may be readily placed upon any ordinary lathe.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings—Figure 1 is a side elevation of a lathe equipped with the present invention. Fig. 2 is a top plan view of the present invention. Fig. 3 is a section taken on line 3—3 of Fig. 2. Fig. 4 is an end view of the present tail stock taken from the centering end thereof.

Referring to the drawings, the numeral 1 designates the base plate of the lathe which carries at one end the live center 2 which is operated as is usual, the present showing being merely indicative of any form of chuck and transmission mechanism.

Mounted by means of bolts 3, adjustably to the said base, is the standard or frame 4 of the present tail stock, the same being provided with the three fixed sleeves 5, 6 and 7 which are disposed in spaced relation to each other, the sleeves 5 and 6 being provided each with a smooth bore, the bore of each of the sleeves 5 and 6 being in axial alinement. Mounted for sliding movement within the respective bores of the sleeves 5 and 6 is a sleeve or tube 8, one end of which is provided with exterior screw threads 9, which form a means for imparting longitudinal sliding movement to the sleeve within the sleeves 5 and 6. An interiorly threaded sleeve 10 is disposed to engage the threaded portion 9, of the sleeve 8 between the sleeves 5 and 6 and provide a means for imparting the longitudinal movement necessary to the sleeve 8. This sleeve 10 is provided with a beveled gear 11 and with a cylindrical gear 12. In order to hold the sleeve 8 against rotation during the longitudinal movement imparted thereto, a recess 13 is formed longitudinally thereof and engages the key 14 carried by the frame or standard 4, as clearly shown in Fig. 3.

In order to rotate the sleeve 10 through the bevel gear 11, a handle 15 is keyed upon the shaft 16, journaled in the bracket 17 and carries a beveled gear 18 which as shown in Figs. 2 and 4 meshes with the gear 11, so that as the handle 15 is rotated in either direction, the necessary longitudinal movement is imparted to the sleeve 8.

When it is desired to produce an automatic movement to the sleeve 8, a gear 19 is provided and journaled in the frame or base 4, said gear 19 being operably connected to any part of the rotating mechanism of the lathe (not shown). The end of the sleeve 8 opposite to the threaded portion 9 is provided with the reduced threaded portion 20, for the reception of the tool carrying member 21, provided with the cutting teeth 22 upon its face, while disposed for sliding movement within the bore of the sleeve is a "dead center" or rod 23, the same carrying upon its free end the removable centering pin 24, while the threaded portion 25 of the rod 23 is fitted through the threaded bore 26 of the projecting arm or bracket 7, a hand wheel 27 being keyed upon the extreme end of the rod 23 and in ready access for manipulating the rod 23 and its pin 24.

From the foregoing description, taken in connection with the drawings the operation of the present device is readily understood, the same being set at the desired adjustment by means of the screw 3 upon the base plate 1 of the lathe and as the center 4 may be projected or retracted relatively to the sleeve 8, the work W is first centered at the center 2, while the end adjacent to the tail stock is alined to receive the pin 24 of the dead center 23, the hand wheel 27 being rotated to properly position the center 24, as clearly shown in Fig. 1. The work W is now rotated in the usual manner, and the hand wheel 15 is then manipulated to move the sleeve 8 outwardly and place the cutter 22 in engagement with the end of the work about the center 4. It will thus be seen that the centers of the work will be maintained at all times, and that the cutting tool 22 will properly cut the face of the work adjacent to the tail stock.

What is claimed is:

1. A tail stock for lathes, including a support for attachment to a lathe, two sleeves carried by said support and in spaced relation to each other, a tubular member slidably mounted in said sleeves and provided with exterior screw threads at one end, an interiorly screw threaded sleeve disposed between the sleeves of the support and embracing the threaded portion of the tubular member, coacting means carried by the support and tubular member for permitting sliding motion to the member and for preventing the rotation thereof, means for operating the interiorly threaded sleeve for imparting longitudinal movement to the tubular member, a tool detachably carried by the tubular member upon the end remote from the screw threaded end, and a longitudinally adjustable centering rod mounted within the tubular member and adjustably engaging the support.

2. A tail stock for lathes, including a support for attachment to a lathe, two sleeves carried by said support and in spaced relation to each other, a tubular member slidably mounted in said sleeves and provided with exterior screw threads at one end, an interiorly screw threaded sleeve disposed between the sleeves of the support and embracing the threaded portion of the tubular member, coacting means carried by the support and tubular member for permitting sliding motion to the member and for preventing the rotation thereof, means for operating the interiorly threaded sleeve for imparting longitudinal movement to the tubular member, a longitudinally adjustable centering rod mounted within the tubular member and adjustably engaging the support, and a detachable cutting tool carried upon the free end of the tubular member and concentrically about the centering rod.

3. A tail stock for lathes, including a lathe bed engaging support, two sleeves carried by the support and in spaced relation, an arm carried by said support and provided with a threaded bore in axial alinement with the center of the sleeve, a tool carrying tubular member slidably mounted in the sleeve, coacting means carried by the tubular member and the support between the sleeves for imparting longitudinal movement to the tool carrying tubular member, and a manually operable centering rod having a threaded portion engaging the threaded bore of the arm of the support with the remaining portion longitudinally movable within the tubular member.

In testimony that we claim the foregoing as our own, we have hereto affixed our signatures in the presence of two witnesses.

FREDERICK H. WICKS.
CHARLES GOODMAN.

Witnesses:
J. L. MULLEN,
J. M. RALEIGH.